United States Patent [19]

Lew

[11] Patent Number: 4,628,744
[45] Date of Patent: Dec. 16, 1986

[54] S-TUBE CORIOLIS FORCE FLOW METER

[76] Inventor: Hyok S. Lew, 7890 Oak St., Arvada, Colo. 80005

[21] Appl. No.: 725,986

[22] Filed: Apr. 22, 1985

[51] Int. Cl.$^4$ .............................................. G01F 1/84
[52] U.S. Cl. .................................................. 73/861.38
[58] Field of Search ........................ 73/861.37, 861.38

[56] References Cited

U.S. PATENT DOCUMENTS 4,491,025  1/1985  Smith et al. ...................... 73/861.38
4,559,833 12/1985  Sipin ................................. 73/861.38

Primary Examiner—Charles A. Ruehl

[57] ABSTRACT

A flowmeter comprised of a substantially S-shaped tube extending to a rigidly anchored inlet tube at one extremity and to a rigidly anchored outlet tube at the other extremity and at least one electromagnetic vibrator disposed at the midsection of the S-shaped tube that imposes low amplitude high frequency oscillatory flexural movements on the inlet tube-S-tube-exit tube combination having two fixed ends in the direction substantially perpendicular to the plane including the S-tube, which oscillatory flexural movements interacting with the fluid moving through the S-tube produces fluid dynamic Coriolis forces that twists the S-tube about an axis substantially tangential to the central axis of the S-tube at the midsection of the S-tube. The amount of twist of the S-tube is directly related to the time rate of mass flow through the S-tube and, consequently, the time rate of mass flow can be measured by measuring the amount of twist of the S-tube.

4 Claims, 5 Drawing Figures

U.S. Patent  Dec. 16, 1986  4,628,744
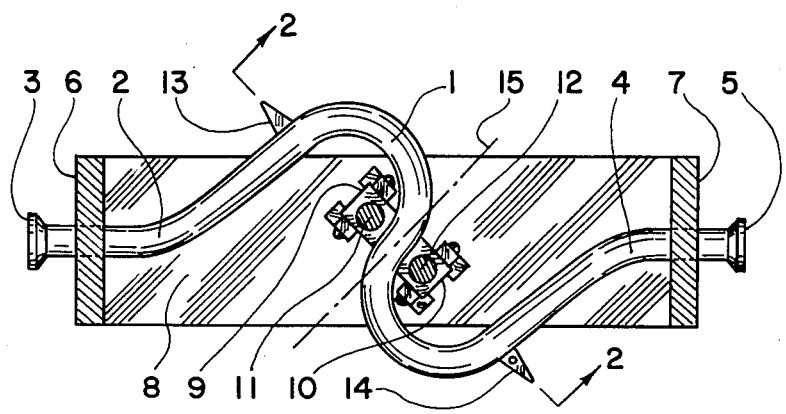
Fig. 1
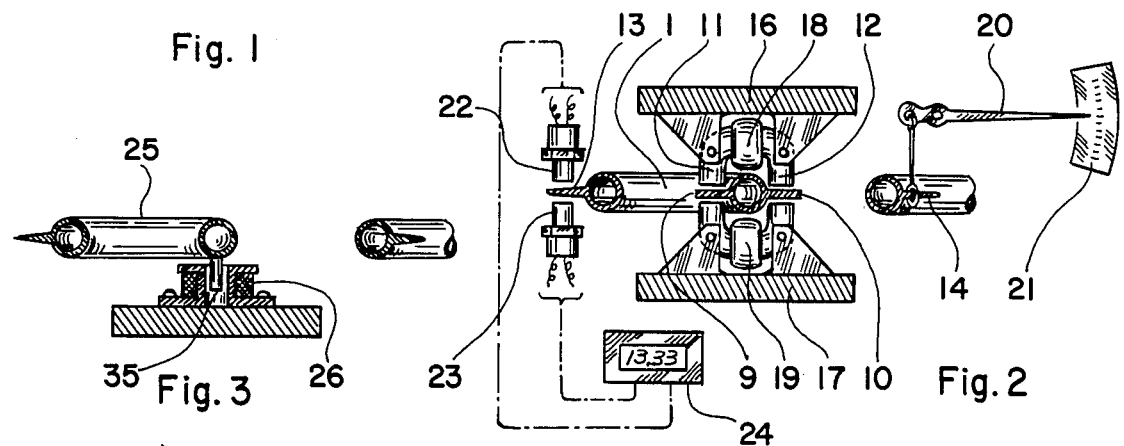
Fig. 2
Fig. 3
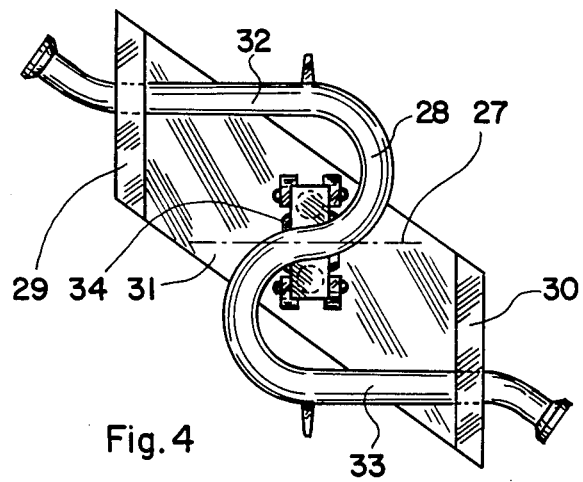
Fig. 4
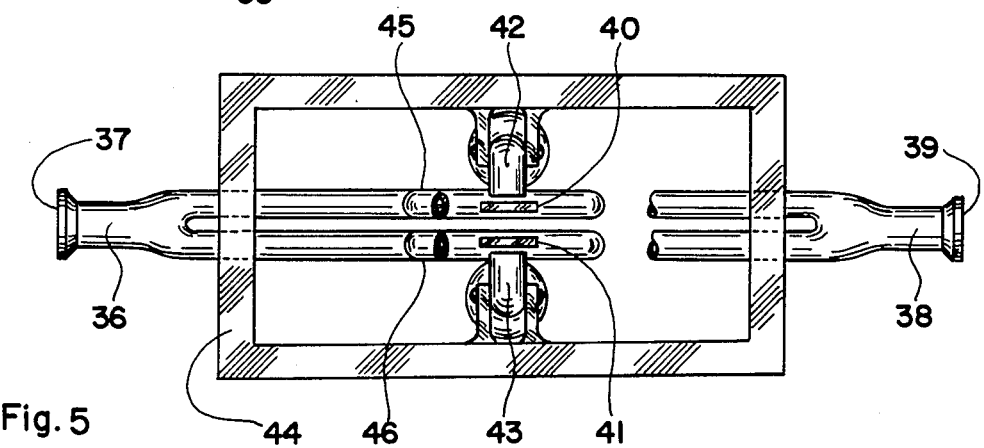
Fig. 5

4,628,744

S-TUBE CORIOLIS FORCE FLOW METER

BACKGROUND OF THE INVENTION

The principles of the fluid dynamic Coriolis force generated by the fluid moving through a U-tube, which produces a twisting moment about the axis of the symmetry of the U-tube, and its application in the construction of a flow meter known as the Coriolis force flow meter has been recognized and practiced for more than fifty years. All of the more successful versions of the Coriolis force flow meters available at the present time employ a U-tube affixedly anchored at the inlet and the outlet of the U-tube that is under low amplitude high frequency oscillary movements in a direction perpendicular to the plane including the U-tube, which oscillatory movements are generated by an electromagnetic vibrator disposed at the mid point of the U-tube. Although the principles of the fluid dynamic Coriolis force taking place in the fluid flow through the U-tube has been successfully applied in the construction of the U-tube Coriolis force flow meter, few of the experts as well as the laymen in the art understand the fact that the Coriolis force that twists the U-tube about the axis of symmetry of the U-tube is created by the oscillatory pivoting movements of the over-hanging U-tube about an axis passing through two affixedly anchored extremities of the U-tube of an angle perpendicular to the axis of symmetry of the U-tube rather than the simple rectilinear oscillatory movements of the U-side extremity of the U-tube in a direction perpendicular to the plane including the U-tube. Because of the aforementioned ignorance of experts as well as laymen in the art, all of the skilled as well as the unskilled in the art have thought that the use of the U-tube is unavoidable and absolutely necessary in constructing a Coriolis force flow meter.

This inventor is one of the first investigators to discover and recognize the truth that the fluid dynamic Coriolis force results from the interaction between the turning motion of the fluid in the U-tube and the oscillatory angular movement of the U-tube about an axis parallel to the plane including the U-tube and perpendicular to the axis of symmetry of the U-tube. Once the aforementioned truth is understood, one realizes that the use of the U-tube is only a sufficient condition to construct a Coriolis force flow meter, but it is not a necessary condition.

The primary object of the present invention is to provide a Coriolis force flow meter that is far more sensitive and accurate than the U-tube Coriolis force flow meter.

Another object is to provide a Coriolis force flow meter including a far less laterally protruding structure compared with the U-tube Coriolis force flow meter.

A further object is to provide a Coriolis force flow meter providing much more smooth and direct flow passage between the inlet and outlet of the flow meter compared with the U-tube Coriolis force flow meter.

Yet another object is to provide a Coriolis force flow meter comprising a S-tube extending to an inlet tube at one extremity and to an outlet tube at the other extremity wherein the center lines of the inlet tube and the outlet tube are substantially in-line to one another.

Yet a further object is to provide the S-tube Coriolis force flow meter with an electromagnetic vibrator exerting oscillatory forces or the S-tube in a direction perpendicular to the plane including the S-tube, which oscillatory forces are exerted at the mid point of the S-tube.

These and other objects of the present invention will become clear as the description thereof proceeds.

BRIEF DESCRIPTION OF THE FIGURES

The present invention may be described with a greater clarity and specificity by referring to the following figures:

FIG. 1 illustrates a plan view of an S-tube Coriolis force flow meter.

FIG. 2 illustrates a cross seciton of the S-tube Coriolis force flow meter of FIG. 1 taken along a plane 2—2 as shown in FIG. 1.

FIG. 3 illustrates another embodiment of arrangement of the electromagnetic vibrator usable in conjunction with a S-tube Coriolis force flow meter.

FIG. 4 illustrates a plan view of another S-tube Coriolis force flow meter.

FIG. 5 illustrates an elevation view of a further embodiment of the S-tube Coriolis force flow meter.

DESCRIPTION OF THE ILLUSTRATED EMBODIMENTS

In FIG. 1 there is illustrated a plan view of an embodiment of the S-tube Coriolis force flow meter constructed in accordance with the principles of the present invention, wherein the top half of the bracket is removed to show the arrangement of the S-tube. The S-tube 1 comprises a tube bent to a substantially S-shaped configuration. The one extemity of the S-tube 1 extends to an inlet tube 2 with a tube coupling means 3, while the other extremity of the S-tube 1 extends to an outlet tube 4 with a tube coupling means 5. It should be understood that the inlet tube—S tube—outlet tube combination is constructed of a material of high stiffness such as a metal or plastic in a smooth integrated structure. The inlet tube 2 and the outlet tube 4 are rigidly secured at their extremities to two flanges 6 and 7 of the bracket 8, respectively, which bracket has a rigid structure. A pair of vibrating fins 9 and 10 rigidly affixed to the S-tube 1 at the mid portion thereof in a configuration parallel to the plane including the S-tube 1 extend in two opposite direction. The electromagnetic vibrators 11 and 12 rigidly secured to the bracket 8, which are two poles of a electromagnet energized by a high frequency pulsating electric currents, imposes the oscillatory flexural movements on the S-tube 1 in the direction substantially perpendicular to the plane including the S-tube 1. A pair of position indicating means 13 and 14 are respectively included on the S-tube 1 at two opposite extremities of the S-tube 1 in a mirror image to one another with respect to the torque axis 15 that is a line tangential to the central axis of the S-tube 1 at the mid section of the S-tube 1 which is the section of inflection of the S-tube 1.

In FIG. 2 there is illustrated a cross section of the S-tube Coriolis force flow meter shown in FIG. 1 taken along plane 2—2 as shown in FIG. 1. The S-tube 1 is disposed intermediate the top plate 16 and the bottom plate 17 of the bracket 8. The electromagnet 18 including two poles 11 and 12 respectively disposed adjacent to the vibrating fins 9 and 10, which is rigidly secured to the top plate 16 of the bracket 8, imposes oscillatory movements on the vibrating fins 9 and 10 and, consequently, on the S-tube 1. The electromagnet 19 rigidly secured to the bottom plate 17 of the bracket 8 may be included in order to enhance the vibration. A preferred mode of using two electromagnets 18 and 19 is to use the electromagnet 19 energized by a steady weak electric current to stabilize the S-tube at an equilibrium position, while the electromagnet 18 energized by a strong pulsating electric current creates the oscillatory movements on the S-tube 1. It is obvious that the steady force electromagnet 19 may be substituted by a permanent magnet. As the combination of the inlet tube—S tube—outlet tube has a structure with rigidity and stiffness, it maintains its own equilibrium position and, consequently, the steady force magnet 19 may be omitted. It should be understood that there must be provided sufficient gaps between the vibrating fins 9 and 10 and the tips of the poles of the electromagnets 18 and 19 in order to provide a room for the S-tube to twist about an axis tangential to the central axis of the S-tube at the section of inflection of the S-tube. In FIG. 2 there are included a couple of different illustrative embodiments for measuring the amount of the twist of the S-tube about the torque axis 15 as shown in FIG. 1, that coincides with the line tangential to the center line of the S-tube 1 at the point of inflection thereof. A pivotable pointing needle 20 mechanically linked to the position indicator 14 may be used to indicate the amount of the mass flow rate flowing through the S-tube 1, which figure is displayed on the scale 21, as the amount of the twist of the S-tube 1 about the torque axis 15 is related to the mass flow rate through the S-tube 1. The amount of the twist of the S-tube 1 may be measured by electromagnetic means using proximity position sensors 22 and 23, or by electro-acoustic means or by electro-optical means, wherein the information on the amount of the twist of the S-tube 1 is processed and converted to the information on the mass flow rate through the S-tube 1, that may be either displayed by a digital display 24 or other display means or retrieved as an output signal to be used as an input signal to other process control equipment.

The S-tube Coriolis force flow meter shown in FIGS. 1 and 2 operates by the following principles: The oscillatory movements of the S-tube in the direction substantially perpendicular to the plane including the S-tube imposed by the electromagnet energized by a pulsating electric current of frequency equal to the resonance frequency of the inlet tube—S tube—outlet tube combination including fluid flowing therethrough or equal to integer times thereof creates a high frequency low amplitude oscillatory pivoting movement of the S-tube 1 about an axis parallel to the plane including the S-tube 1 and intersecting the torque axis 15 shown in FIG. 1 at a perpendicular angle, which oscillatory pivoting movement is created as a result of the oscilatory deflective movements of the beam comprising the inlet tube—S tube—outlet tube combination having two fixed ends. This oscillatory angular movement of the S-tube represented by an angular velocity vector parallel to the plane including the S-tube 1 and perpendicular to the torque axis 15 interacts with the rotational movement of the fluid flowing through the S-tube represented by an angular velocity vector perpendicular to the plane including the S-tube wherein the phenomenon known as the precession in the classical mechanics of the rotating body takes place which results in a torque about the torque axis 15 that twists the S-tube about the torque axis 15. This torque is directly proportional to the mass flow rate through the S-tube and, consequently, when the stiffness factor of the torsion beam comprising the inlet tube—S tube—outlet tube combination is taken into consideration, the mass flow rate through the S-tube can be determined as a function of the twist angle of the S-tube about the torque axis 15. It should be understood that the first order effect of the precession alternates in time at a high frequency and consequently, does not produce a net twist of the S-tube. It is the second order effect of the precession that produces a net twist of the S-tube, as the second order effect fluctuates in time at a high frequency without alternating from plus to minus and vice versa. It should be further understood that the S-tube may be vibrated at any high frequency to generate the aforementioned second order effect of the precession. Vibrating the S-tube at a resonance frequency is desirable because the maximum result is created with the minimum energy input to the vibrating electromagnet. The vibration of the S-tube at a high frequency is required to obtain the aforementioned second order effect of the precession of a measurable magnitude that is porportional to the mass flow rate through the S-tube times the square of the frequency of the vibration imposed on the S-tube.

In FIG. 3 there is illustrated a cross section of another embodiment of the S-tube Coriolis force flow meter, which cross section is equivalent to that shown in FIG. 2. The S-tube 25 may be vibrated by a ferromagnetic cylinder 35 disposed perpendicular to the plane including the S-tube 25 and rigidly affixed to the S-tube 25 at its section of inflection, which slidably engages the hollow core of the solenoid 26 energized by a high frequency pulsating or alternating electric current.

In FIG. 4 there is illustrated a plan view of a further Coriolis force flow meter constructed essentially in the same way as that shown in FIGS. 1 and 2 with a few exceptions being that, firstly, the torque axis 27 of the S-tube 28 is perpendicular to the securing flanges 29 and 30 of the bracket 31, which contrasts the torque axis 15 shown in FIG. 1 disposed at a 45 degree angle with respect to the securing flanges 6 and 7 of the bracket 8, secondly, the inlet tube 32 and the outlet tube 33 connected to the S-tube 28 are disposed parallel to and off set from one another, that contrasts the inlet tube 2 and the outlet tube 4 of FIG. 1 anchored to the bracket 8 in an in-line arrangement, and lastly, the S-tube 28 is driven by a single electromagnet 34. It should be noticed that the bracket 31 is made of a section of a channel, while the bracket 8 of FIG. 1 is made of a section of a rectangular tubing. The Coriolis force flow meter shown in FIG. 4 operates by the same principles as that described in conjunction with FIG. 1.

In FIG. 5 there is illustrated an elevation view of an embodiment of the twin S-tube Coriolis force flow meter, which is viewed through a plane perpendicular to the plane including the S-tube. The twin S-tube Coriolis force flow meter includes a pair of the inlet tube—S tube—outlet tube combinations 45 and 46 superimposed to one another in a parallel configuration with a small gap therebetween. The individual inlet tube—S tube—outlet tube combination included in the twin S-tube arrangement may have the same construction as that shown in FIG. 1 or that of FIG. 4. The inlet tubes and the outlet tubes included in the twin S-tube arrangement are respectively merged to a single inlet tube 36 with a tube coupling means 37 and a single outlet tube 38 with a tube coupling means 39. The vibrating fins 40 and 41 respectively affixed to the individual S-tubes are driven by two vibrating electromagnets 42 and 43 synchronized to one another, whereby the oscillatory flexural movements of the two S-tubes are mirror images of one another. The twin S-tube arrangement provides an advantage in that the reactions to the vibrations of two individual S-tubes cancel each other and, consequently, the bracket 44 securing the inlet tubes and the outlet tubes of the S-tube assemblies can be made lighter and less rigid compared with the bracket in the single S-tube Coriolis force flow meter shown in FIG. 1 or 4. Of course, the vibrating fins 40 and 41 may be driven by a single electromagnet installed therebetween and anchored to the bracket 44.

The single or twin S-tube Coriolis force flow meter taught by the present invention has sensitivity and accuracy twice greater than the conventional U-tube Coriolis force flow meter, because the second order effect of the precession is 100 percent greater with the S-tube arrangement and the twist of the S-tube is more predictable and consistent due to the lack of over-hanging structure compared with a U-tube.

While the principles of the present invention have now been made clear by the illustrative embodiments, it will be immediately obvious to those skilled in the art many modifications in the structures, arrangements, proportion, elements and materials which are particularly adapted to the specific working environments and operating conditions in the practice of the invention without departing from those principles.

I claim:

1. A flow rate measuring device comprising in combination:
   (a) a support;
   (b) a sinuous conduit secured to said support at two extremities of said sinuous conduit including a first smooth bend adjacent to one extremity of said sinuous conduit turning about a first direction; a second smooth bend adjacent to said first smooth bend turning about a second direction opposite to said first direction; a third smooth bend adjacent to said second smooth bend turning about said first direction; and a fourth smooth bend intermediate said third smooth bend and the other extremity of said sinuous conduit turning about said second direction, wherein the combination of said first and second smooth bends and the combination of said third and fourth bends are radially symmetric to one another and the common tangent line simultaneously tangential to said second and third smooth bends and passing through the midsection of said sinuous conduit substantially intersects the line connecting the two extremities of said sinuous conduit at an angle substantially less than ninety degrees;
   (c) means for exerting oscillatory force to said sinuous conduit at said midsection of said sinuous conduit wherein said means vibrates said sinuous conduit in a direction transverse to the plane including said sinuous conduit, and thus creating oscillatory flexural movements of equal signs for the two halves of said sinuous conduit and creating oscillatory pivoting movements of opposite signs for said second and third smooth bends; and
   (d) a first means disposed substantially adjacent to one extremity of said second smooth bend connected to said first smooth bend, and a second means disposed substantially adjacent to one extremity of said third smooth bend connected to said fourth smooth bend for measuring oscillatory torsional motion of said sinuous conduit about an axis parallel to said common tangent line as a measure of mass flow rate of fluid moving through said sinuous conduit.

2. The combination as set forth in claim 1 wherein said combination includes a second sinuous conduit identical to said first sinuous conduit disposed parallel to said first sinuous conduit and secured to said support at two extremities, wherein said means for exerting oscillatory force vibrates said first and second sinuous conduits in two opposite directions transverse to the plane including said first sinuous conduit, and said first and second means for measuring oscillatory torsional motion measures relative oscillatory torsional motion between said first and second sinuous conduits about said axis as a measure of sum of mass flow rate of fluid moving through said first and second sinuous conduits.

3. A flow rate measuring device comprising in combination:
   (a) a support;
   (b) a sinuous conduit secured to said support at two extremities of said sinuous conduit, said sinuous conduit including a first substantially straight portion adjacent to one extremity of said sinuous conduit; a first smooth bend adjacent to said first substantially straight portion turning about a first direction; a second smooth bend adjacent to said first smooth bend turning about a second direction opposite to said first direction; and a second substantially straight portion intermediate said second smooth bend and the other extremity of said sinuous conduit, wherein the combination of said first substantially straight portion and said first smooth bend and the combination of said second smooth bend and said second substantially straight portion are radially symmetric to one another, and the common tangent line simultaneously tangential to said first and second smooth bends and passing through the midsection of said sinuous conduit substantially intersects the line connecting the two extremities of said sinuous conduit at an angle substantially less than ninety degree;
   (c) means for exerting oscillatory force to said sinuous conduit at said midsection of said sinuous conduit wherein said means vibrates said sinuous conduit in a direction transverse to the plane including said sinuous conduit and thus creates oscillatory flexural movements of equal signs for the two halves of said sinuous conduit and creates oscillatory pivoting movements of opposite signs for said first and second smooth bends; and
   (d) a first means disposed substantially adjacent to one extremity of said first smooth bend connected to said first substantially straight portion, and a second means disposed substantially adjacent to one extremity of said second smooth bend connected to said second substantially straight portion for measuring oscillatory torsional motion of said sinuous conduit about an axis substantially parallel to said common tangent line as a measure of mass flow rate of fluid moving through said sinuous conduit.

4. The combination as set forth in claim 3 wherein said combination includes a second sinuous conduit identical to said first sinuous conduit disposed parallel to said first sinuous conduit and secured to said support at two extremities, wherein said means for exerting oscillatory force vibrates said first and second sinuous conduits in two opposite directions transverse to the plane including said first sinuous conduit, and said first and second means for measuring oscillatory torsional motion measures relative oscillatory torsional motion between said first and second sinuous conduits about said axis as a measure of sum of mass flow rate of fluid moving through said first and second sinuous conduits.

* * * * *